PSEUDOCUMENE ———
P-CYMENE  — — — — —

United States Patent Office 3,287,261
Patented Nov. 22, 1966

3,287,261
SELECTIVE EXTRACTION OF C₉–C₁₁ AROMATIC HYDROCARBONS
Yu-Tang Hwang, Crystal Lake, Ill., assignor, by mesne assignments, to Union Oil Company of California, Los Angeles, Calif., a corporation of California
Continuation of application Ser. No. 269,559, Apr. 1, 1963. This application Mar. 28, 1966, Ser. No. 539,607
15 Claims. (Cl. 208—330)

This application is a continuation of Serial No. 269,559 filed April 1, 1963, now abandoned.

This invention relates to a process for the selective solvent extraction of $C_9$–$C_{11}$ aromatic hydrocarbons from admixture with non-aromatic or paraffinic hydrocarbons. This invention is based on the discovery that a certain class of polar esters of carbamic acid and N-substituted carbamic acids in which the ester group contains at least one polar substituent, have good selectivity in the extraction of $C_9$–$C_{11}$ aromatic hydrocarbons from non-aromatic mixtures containing same when used with about 3.0% to 8.0 wt. percent of water. This invention relates to an improvement over the process of U.S. Patent 3,003,005.

The art recognizes the difficulties attendant on the separation of hydrocarbons having similar boiling points and many methods have been perfected for effecting such separations, including highly complex fractional distillations, chemical processes, selective adsorption, solvent extraction and the like. The solvent extraction process has been explored with particular vigor because of the availability of a vast number of new solvents and the general simplicity and efficiency of this method. For this purpose, many different solvents have been proposed and connected with various techniques for recovery of the desired extract from the extract phase and for solvent purification. Ordinarily in this solvent extraction processes, the extraction is effected in the liquid phase by thoroughly mixing the hydrocarbon mixture with the solvent, allowing the resultant mixture to separate into two phases and separating the phases by decantation.

In accordance with the invention of said related patent the discovery was made, in the course of testing a large number of selective solvents, that esters of carbamic acid and N-substituted carbamic acids, in which the ester group contains at least one polar constituent, possess good selectivities toward aromatics, whereas similar esters in which the ester group does not contain a polar group do not exhibit such selectivity.

In accordance with this invention, I have found that a minimum of about 3.0% by weight and a maximum of about 8.0% by weight of water are necessary to maintain good selectivity and capacity of the solvent composition for $C_9$–$C_{11}$ aromatic hydrocarbons, e.g., cumene, pseudocumene and p-cymene in liquid-liquid extraction systems.

The solvents used in accordance with this invention are represented by the formula

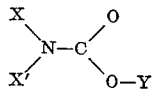

wherein X and/or X' are substituent groups which may broadly be hydrogen, alkyl groups, cycloalkyl groups, aryl groups, polar-substituted alkyl groups, polar-substituted aryl groups, polar-substituted alkaryl and heterocyclic groups all having 1 to 10 carbon atoms and Y is a polar-substituted alkyl, aryl, alkaryl, aralkyl, or cycloalkyl group. More specifically, X and/or X' may be selected substituents from the following groups: hydrogen, methyl, ethyl, propyl, isopropyl, butyl, isobutyl, tertiary butyl, amyl, isoamyl, cyclopentyl, cyclohexyl, cycloheptyl, phenyl, tolyl, xylyl, naphthyl, hydroxymethyl, hydroxyethyl, hydroxypropyl, hydroxyisopropyl, hydroxybutyl, hydroxyisobutyl, hydroxyamyl, hydroxyisoamyl, cyanomethyl, cyanoethyl, cyanopropyl, cyanobutyl, cyanoisobutyl, cyanoamyl, cyanoisoamyl, methoxymethyl, methoxyethyl, methoxypropyl, methoxyisopropyl, methoxybutyl, methoxyisobutyl, methoxyamyl, methoxyisoamyl, acetamidoethyl, acetamidopropyl, acetamidoisopropyl, acetamidobutyl, acetamidoisobutyl, acetamidoamyl, carboethoxyethyl, carboethoxypropyl, carboethoxyisopropyl, carboethoxybutyl and carboethoxyamyl. Additional specific substituent groups include nitrophenyl, i.e., 4-nitrophenyl, cyanophenyl, i.e., 4-cyanophenyl, morpholinyl, pyridyl and piperidinyl and the like.

Y in the above formula is a polar-substituted alkyl, aryl, alkaryl, aralkyl, cycloalkyl or heterocyclic group including the aforementioned hydroxyalkyl, cyanoalkyl, methoxyalkyl, acetimidoalkyl and carboethoxyalkyl groups in relation to the definition of X and X' also having 1 to 10 carbon atoms. Other polar groups that may be used in place of or along with the foregoing are the fluoro, chloro, iodo, and bromo groups.

It becomes therefore a primary object of this invention to provide a method of selectively extracting $C_9$–$C_{11}$ aromatic hydrocarbons from non-aromatic hydrocarbon mixtures containing same using critical amounts of water ranging from about 3.0 to 8.0 wt. percent with certain polar-substituted carbamates and carbamic acid esters as herein defined.

Another object of this invention is to provide a method of selectively extracting $C_9$–$C_{11}$ aromatic hydrocarbons and alkyl-substituted homologues thereof from non-aromatic hydrocarbon mixtures containing same by treatment with a solvent comprising critical amounts of water and esters of carbamic acid and N-substituted carbamic acids of the general formula:

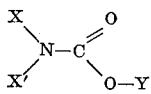

wherein X and/or X' are substituents selected from the group consisting of hydrogen, alkyl, cycloalkyl, aryl, polar-substituted alkyl, polar-substituted aryl, and heterocyclic radicals and Y is a polar substituent.

A further object of the invention is to provide a method of producing substantially pure cumene, pseudocumene and p-cymene by solvent extraction of a cumene-, pseudocumene-, and p-cymene-containing paraffinic hydrocarbon mixture with a mono-, or di- or tri-polar-substituted ester of carbamic acid or N-substituted carbamic acid containing essentially only 3.0 to 8.0% by wt. water.

These and other objects of the invention will be related in whole or in part or become apparent from the description of the invention. The invention will be illustrated by a number of experiments and also by reference to the drawings wherein.

To be commercially useful for the liquid phase extraction of aromatics, the solvent must have a selectivity, defined as $$\frac{\text{conc. arom. in extract}}{\text{conc. non-arom. in extract}} \bigg/ \frac{\text{conc. arom. in raffinate}}{\text{conc. non-arom. in raffinate}}$$

which is greater than unity, and must also exhibit a high distribution coefficient (or capacity), preferably also higher than unity. Solvent extraction processes are more economical if comparatively lower solvent-to-feed ratios are used as a result of higher distribution coefficients. With a single solvent these performance characteristics are determined by the feed and temperature. If a second component or anti-solvent is introduced into the solvent, the performance characteristics are greatly influenced by the concentration of the second component. This secondary influence is not necessarily in the direction of improving the performance characteristics of the primary solvent as is known in this art. The effect thereof is entirely empirical. This invention is based on the discovery that water, as the second component, with polar substituted carbamate solvents has a critical concentration when used at room temperature and atmospheric pressure at solvent-to-feed ratios of about 2 to 15, to achieve a maximum recovery of $C_9$ to $C_{11}$ aromatics of highest purity.

In order to demonstrate the important role of water content in changing the performance characteristics of HEDMC solvent in the extraction of pseudocumene from a mixture of this solvent and a close-boiling non-aromatic hydrocarbon, n-decane, the following examples are given:

EXAMPLE I

Anhydrous HEDMC was used in the extraction of pseudocumene from a mixture of n-decane and pseudocumene. To determine the whole range of extraction performance, a triangular phase diagram was determined by gradually adding a third component to the mixture of the other two components to the point where the number of phases changed from one to two or vice versa. The compositions of the points thus determined are as follows:

*Table I*

| HEDMC, Vol. Percent | Pseudocumene, Vol. Percent | n Decane, Vol. Percent |
| --- | --- | --- |
| 20.3 | 59.7 | 20.0 |
| 68.3 | 25.2 | 6.5 |
| 48.7 | 39.1 | 12.2 |
| 4.0 | 48.3 | 47.7 |

Figure 1:
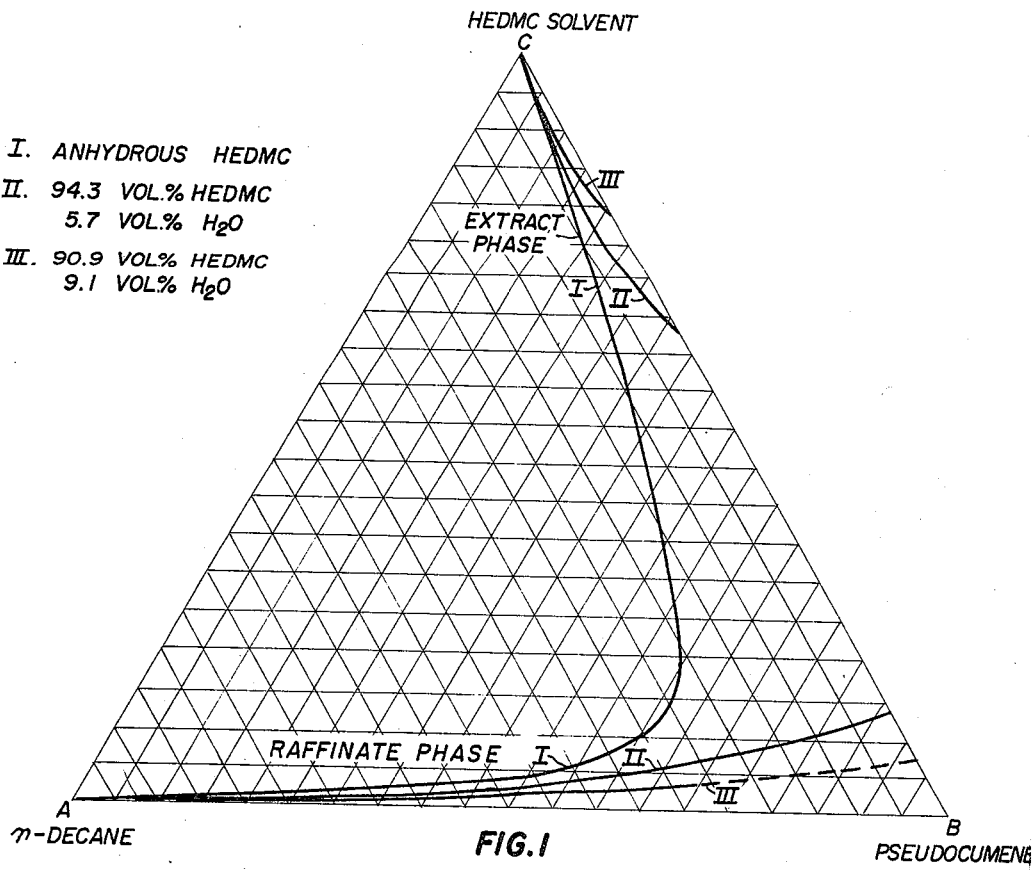
FIGURE 1 is a phase diagram of the ternary data obtained using hydroxyethyldimethyl carbamate (HEDMC), with varying amounts of water, in the extraction of pseudocumene from n-decane.
Figure 2:
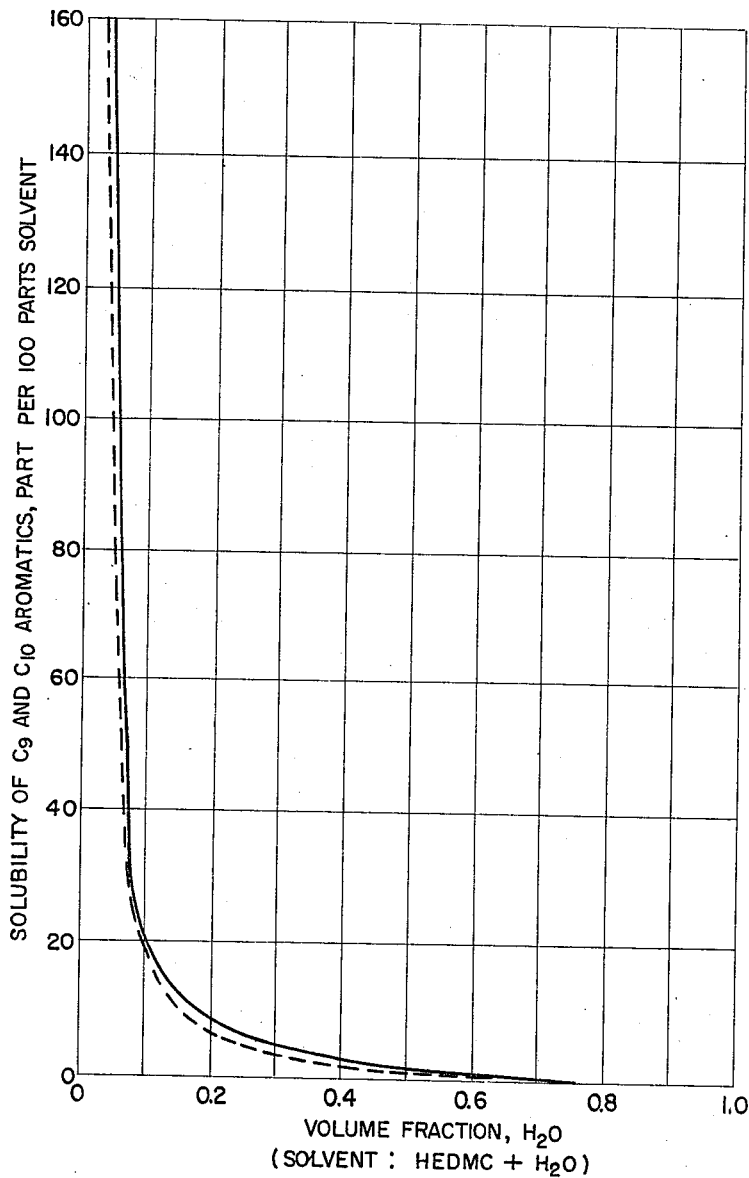
FIGURE 2 is a graph of the solubility of $C_9$ and $C_{10}$ aromatics in HEDMC containing various volume fractions of water.

A two-phase equilibrium curve based on this data is plotted in FIGURE 1 (curve I).

EXAMPLE II

HEDMC containing 5.7 vol. percent (5.4 wt. percent) water was used in the extraction of pseudocumene from a mixture of n-decane and pseudocumene. The procedure called for the complete mixing of approximately equal volumes of hydrocarbon feed and the solvent. After the mixture had settled and separated into two layers, the raffinate layer was analyzed by infrared spectrometry and the composition of corresponding extract phase was calculated by material balance. The results were as follows:

*Table II*

A. EXTRACTION

| Mix No. | Hydrocarbon Feed | | Cc. of solvent | Volumetric Results | |
| --- | --- | --- | --- | --- | --- |
| | Pseudocumene, cc. | n-Decane, cc. | | Volume of Raff., cc. | Volume of Ext., cc. |
| 1 | 1.88 | 3.65 | 5.10 | 5.33 | 5.30 |
| 2 | 2.12 | 1.37 | 3.60 | 2.94 | 4.15 |
| 3 | 3.60 | 0.0 | 3.56 | 2.15 | 5.05 |
| 4 | 2.40 | 0.60 | 3.00 | 2.20 | 3.80 |

B. ANALYSES

| Mix No. | Raffinate (Vol. Percent) | | | Extract (Vol. Percent) | | |
| --- | --- | --- | --- | --- | --- | --- |
| | Pseudocumene | n-Decane | Solvent | Pseudocumene | n-Decane | Solvent |
| 1 | 30.0 | 69.0 | 1.0 | 7.5 | 2.0 | 90.5 |
| 2 | 53.1 | 44.6 | 2.3 | 15.0 | 2.4 | 82.6 |
| 3 | 86.0 | 0.0 | 14.0 | 37.1 | 0.0 | 62.9 |
| 4 | *69.5 | *23.8 | *6.7 | 25.0 | 2.3 | 72.7 |

*By interpolation.

The two-phase equilibrium curve based hereon is represented by curve II in FIGURE 1.

EXAMPLE III

HEDMC containing 9.1 vol. percent (8.2 wt. percent) water was evaluated as a solvent for extracting pseudocumene from a mixture of pseudocumene and n-decane. A triangular phase diagram was constructed by the method described in Example I for an extract phase and the part of the raffinate phase of greatest interest. Data obtained is summarized as follows:

*Table III*

| n-Decane, Vol. percent | Pseudocumene, Vol. percent | HEDMC plus 8.2 wt. percent $H_2O$, Vol. percent |
| --- | --- | --- |
| 0 | 21.2 | 78.8 |
| 1.5 | 12.3 | 86.2 |
| 49.5 | 48.3 | 2.2 |

The two-phase equilibrium curve is shown in FIGURE 1 (curve III).

In the feed-solvent system of this invention the decisive factor which changes the performance characteristics of the extraction solvent is the mutual solubility of aromatics and the solvent. If the aromatic is completely miscible with the solvent, the two-phase equilibrium curve should stay away from the base lines connecting A–B and B–C (FIGURE 1) since aliphatic and aromatic hydrocarbons are also completely miscible. Therefore, the general tendency can be represented by curve I (FIGURE 1). If the solvent is only partially miscible with the aromatics and practically immiscible with non-aromatics, the two-phase equilibrium curve becomes discontinuous at the base line B–C, that is, the upper branch represents an extract phase, and the lower branch represents a raffinate phase. From these determinations it is apparent that the capacity decreases as the solubility of aromatics in the solvent decreases. Also the selectivity at first increases as the solubility of aromatics decreases, but eventually reaches the optimum and starts to decrease as the solubility of aromatics in the solvent decreases. Since, in a practical application, the selectivity is usually the most important factor, the optimum solubility of aromatics in the solvent will correspond roughly to that which will give the characteristics of optimum selectivity for a wide range of feed composition. Continued experimentation, quite unexpectedly shows that the practical range of water content is very critical because the solubility of aromatics decreases extremely rapidly within a very narrow range of water content. Examples IV and V illustrate this point.

EXAMPLE IV

A phase diagram of HEDMC-pseudocumene-$H_2O$ system was determined by the method described in Example I. From this diagram, solubility of pseudocumene in a solvent comprising HEDMC and various percentages of water was calculated.

Table IV

| $H_2O$, Vol. percent | pseudocumene, Vol. percent | HEDMC, Vol. percent | Vol. percent $H_2O$ in the solvent | Solubility of pseudocumene cc./100 cc. solv. |
|---|---|---|---|---|
| 2.5 | 50.9 | 46.6 | 5.1 | 103.3 |
| 6.1 | 23.4 | 70.5 | 7.9 | 30.5 |
| 13.4 | 10.4 | 76.2 | 15.0 | 11.6 |
| 24.5 | 4.2 | 71.3 | 25.5 | 5.8 |
| 49.6 | 1.2 | 49.2 | 50.2 | 1.3 |

EXAMPLE V

Same as Example IV except that p-cymene was used in place of pseudocumene.

Table V

| $H_2O$, Vol. percent | p-Cymene, Vol. percent | HEDMC, Vol. percent | Vol. percent $H_2O$ in the solvent | Solubility of p-cymene cc./100 cc. solvent |
|---|---|---|---|---|
| 1.2 | 54.6 | 43.8 | 3.5 | 120.4 |
| 6.3 | 20.9 | 72.8 | 7.9 | 26.5 |
| 21.7 | 4.3 | 74.0 | 22.7 | 4.6 |

EXAMPLE VI

A phase diagram of p-cymene-n-decane-HEDMC (+5.7 vol. percent $H_2O$) was determined (using the method similar to Example III).

Table VI

| Solvent, Vol. Percent | p-Cymene, Vol. Percent | n-Decane, Vol. Percent |
|---|---|---|
| 72.4 | 25.6 | 2.0 |
| 2.6 | 49.5 | 47.9 |
| 8.3 | 91.7 | 0 |
| 7.4 | 79.0 | 13.6 |

Figure 3:
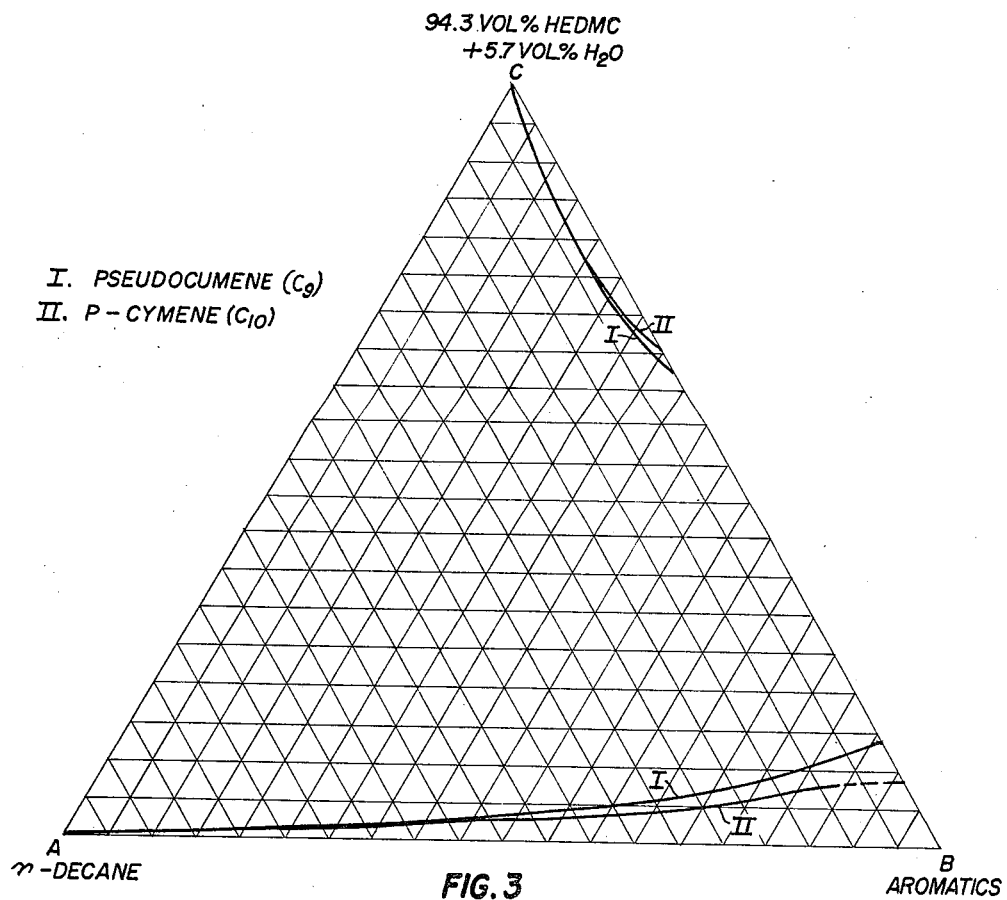
FIGURE 3 is a phase diagram of the ternary data obtained using 5.7 volume percent (5.4 wt. percent) of water in HEDMC in the extraction of pseudocumene and p-cymene from n-decane

The results are compared with Example II in FIGURE 3. The similarity is obvious and all reasonings applicable to $C_9$ aromatics are, therefore, also applicable to $C_{10}$ aromatics.

These results show that for $C_9$ and $C_{10}$ aromatics, the solubility of aromatics drops from infinity to about 20 parts/100 parts solvent as water content increases from 0 to 9 vol. percent (or 0 to 8 wt. percent). In these examples, water contents less than 3 wt. percent are not practical because of the very poor selectivity. Water contents higher than 8 wt. percent are again not practical because both capacity and selectivity are very poor.

The process of this invention is applicable to the treatment of any type of hydrocarbon mixture from which economical yields of $C_9$–$C_{11}$ aromatics can be recovered. Such hydrocarbon mixtures include products obtained from aromatization reactions such as catalytic reforming, hydrocracking and dehydrocyclization processes. Any mixtures containing a paraffinic or naphthenic type hydrocarbon admixed with other aromatics including the $C_9$–$C_{11}$ aromatics can be used, whether they are simple or complex mixtures. The charge oil should be liquid at ordinary temperatures and not subject to decomposition at the extraction temperatures or reaction with the selective solvents used herein.

One suitable charge oil is the class of products known in the art as catalytic reformates. These liquid products contain a fair concentration of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the treatment of a virgin naphtha (B. 175° F.–400° F., API gravity 50° to 60°) with a naphthas to reforming, dehydrogenation, hydrocracking and dehydrocyclization reactions at temperatures ranging platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. Reformates produced by reforming a 200°–400° F. virgin naphtha at about 950° F. and 400 p.s.i.g. in the presence of a catalyst comprising about 0.1 wt. percent of platinum on an alumina base are preferred. These reformates boil between 100° to 450° F., have an API gravity of 40° to 50° and an aromatic content of 45–55 volume percent. The particular reformate used herein was obtained by subjecting a charge naphtha having a boiling range of 101° F. to 418° F., API gravity 49.2, RON clear 84.5, RON+0.3 TEL 94.9, 0.02% sulfur, and containing about 56.4 vol. percent of paraffins and naphthenes, 1.2 vol. percent olefins and 42.4 vol. percent aromatics to reforming at about 950° F. to produce a product having an API gravity of 48.8°, I.B.P. 138° F., E.B.P. 374° F., RON clear 82.0 RON+.3 cc. TEL 93.8 and containing about 54.0 vol. percent paraffins and naphthenes, 1.2 vol. percent olefins and 44.8 vol. percent of aromatics. By precise fractionation and blending to different octane numbers in accordance with U.S. Patent 2,983,776 this reformate feed material exhibited the following analysis:

Table VII

Aromatic: Estimated vol. percent

Benzene _____ 0.5
Toluene _____ 4.4
Mixed xylene and ethyl benzene _____ 12.6
$C_9$ and heavier _____ 28.0

Examples of the compositions of other reformate feed hydrocarbons that may be used are shown in Table VIII giving the volume percent of aromatics in each and the research octane level to which the reforming reaction was directed in each instance.

Table VIII

| Aromatic | 85 Research Octane Level | 90 Research Octane Level | 95 Research Octane Level | 95 Research Octane Level |
|---|---|---|---|---|
| Benzene | 2.96 | 4.19 | 3.41 | 3.85 |
| Toluene | 9.64 | 13.1 | 12.9 | (1) |
| Ethyl benzene | 2.55 | 2.60 | 2.72 | (1) |
| p-Xylene | 2.74 | 2.85 | 2.83 | (1) |
| m-Xylene | 6.45 | 7.03 | 6.73 | (1) |
| o-Xylene | 3.96 | 4.03 | 3.81 | (1) |
| $C_9$ and heavier arom | 17.3 | 17.2 | 22.4 | (1) |
| Total | 45.6 | 51.0 | 54.8 | |

[1] Analyzed for benzene content only.

In general, these feed stocks contain a mixture in various proportions of i-butane, n-butane, i-pentane, n-pentane cyclopentane, 2,2-dimethylbutane, 2,3-dimethylbutane, 2-methylpentane, 3-methylpentane, n-hexane, methylcyclopentane, 2-2-dimethylpentane, benzene, 2,4-dimethylpentane, cyclohexane, 2,2,3-trimethylbutane, 3,3- dimethylpentane, 1,1-dimethylcyclopentane, 2,3-dimethylpentane, 2-methylhexane, cis-1,3-dimethylcyclopentane, trans-1,3-dimethylcyclopentane, 3-methylhexane, trans-1,2-dimethylcyclopentane, 3-ethylpentane, n-heptane, 2,2,4-trimethylpentane, cis-1,2-dimethylpentane, methylcyclohexane, ethylcyclopentane other $C_8$ hydrocarbons, toluene, ethylbenzene, p-xylene, o-xylene and m-xylene and $C_9$–$C_{11}$ aromatics such as cumene, pseudocumene and p-cymene which represent the types of hydrocarbon mixtures from which the desired latter aromatics, as enumerated, may be separated by the present process. In using reformates as feed hydrocarbons, one purpose is to separate the low-octane compounds so that they may be recycled or otherwise upgraded in octane number, and the high-octane-number products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate, a xylene concentrate and a bottoms fraction containing $C_9$–$C_{11}$ aromatics. The bottoms fraction alone is individually treated or mixed in various proportions with paraffinic hydrocarbons and treated to solvent extraction in accordance with this invention to obtain products having a high concentration of the desired $C_9$–$C_{11}$ aromatics. The purpose of treating such concentrates is to recover aromatics of maximum purity for use as organic intermediates, solvents, etc.

The solvent composition of this invention is not suitable for the extraction of lower molecular weight aromatics because of its lower water content. However the used solvent from the solvent extraction of aromatic mixtures to form pure extracts of $C_6$ to $C_8$ aromatics, as described in U.S. Patents 2,003,005 and 2,915,569 has a lowered water content making it suitable for use in treating the aromatic reflux from such processes or for treating the higher boiling $C_9$–$C_{11}$ aromatic fraction of a reformate.

In one aspect of this invention a combination process is provided wherein a feed material containing aromatics such as a catalytic reformate is distilled to produce an intermediate fraction comprising mononuclear aromatics and the alkyl substituted homologues thereof such as benzene, toluene, xylene fractions or fractions containing mixtures thereof and a bottoms or higher boiling fraction containing $C_9$–$C_{11}$ aromatic hydrocarbons. The intermediate fraction is treated in accordance with the method of U.S. Patents 2,003,005 and 2,915,569 using a polar carbamate solvent with 8 to 15 wt. percent of water separating the raffinate and extract phases for purification and recovering the used solvent which because of the nature of the process will now contain a lesser amount of water in the order of 3 to 8 wt. percent for use in extracting the $C_9$–$C_{11}$ aromatics from the higher boiling fraction.

Figure 4:
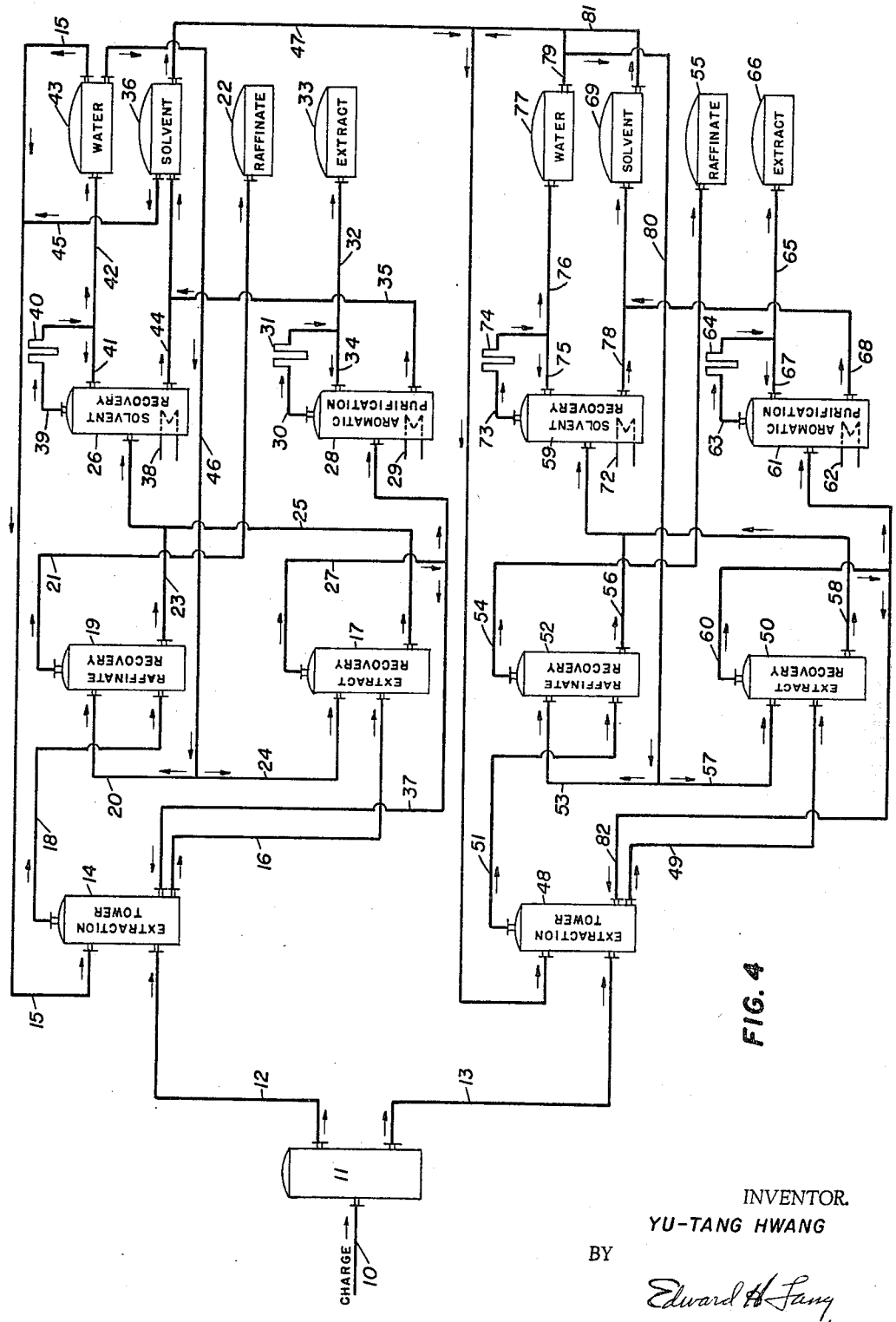
FIGURE 4 is a general flow diagram of the process of this invention.

The invention will be better understood by reference to FIG. 4 wherein there is illustrated the combination process wherein both lower molecular weight and higher molecular weight aromatics are obtained as separate fractions from a common feed, each is individually treated to solvent extraction and the solvent from one operation is recycled to the other. The solvent is recovered by water extraction of the HEDMC from the aromatics and subsequent recovery of the HEDMC is accomplished by distillation.

This is illustrated by reference to FIGURE 4 wherein, for purposes of illustration, a catalytic reformate, containing $C_9$ and heavier aromatics along with $C_6$ to $C_8$ aromatics is passed via line 10 to distillation tower 11, fitted with suitable plates, not shown, to produce, in addition to other fractions, a first fraction predominating in $C_6$ to $C_8$ aromatics which is taken off at line 12 and a second fraction, predominating in $C_9$ to $C_{11}$ or higher aromatics which is taken off at line 13.

The $C_6$–$C_8$ aromatic fraction in line 12 is passed to extraction tower 14 which is fitted with the usual plates and/or baffles (not shown) to increase the degree of contact. Tower 14 is operated at a temperature of about 80° to 120° F. and a pressure of about atmospheric to 5 p.s.i.g. About 5 to 10 parts of HEDMC containing 8 to 15 wt. percent of water enters at line 15, per part of $C_6$–$C_8$ aromatic fraction. Extract phase leaves tower 14 via line 16, passing to secondary extraction tower 17. Raffinate from tower 14 is passed by line 18 to water-wash tower 19, where it is contacted with water from line 20 at a temperature of about 100° to 120° F. This treatment results in the separation of a paraffinic phase, taken off at line 21, and a water-solvent phase, removed at line 23.

Tower 17, which is constructed like tower 14, receives the extract phase from line 16, and this phase flows countercurrently to the water stream furnished by line 24. This produces a solvent-water mixture which is withdrawn through line 25, and mixed with the solvent-water mixture in line 23 from tower 19, to form a combined stream which flows through line 25 to solvent recovery tower 26. The overhead from tower 17, containing most of the $C_6$–$C_8$ aromatic phase, passes through line 27 to aromatic purification tower 28. The application of heat, as by means of steam coil 29, results in the removal of the last traces of solvent from the extract, the latter passing as overhead into line 30, condenser 31 and line 32 to storage 33, a portion thereof being recycled via line 34 to tower 28 and the former being drawn off as bottoms at line 35 to solvent storage 36. A portion of the aromatics recovered in tower 17 is recycled back to tower 14 via lines 27 and 37.

The combined water-solvent mixture in line 25 is distilled in tower 26 by the application of heat through coil 38. The water passes overhead via line 39 to condenser 40. Part of the condensed water is returned to tower 26 as reflux through line 41, the remainder passes via line 42 to water storage 43. The solvent recovered as bottoms from the distillation passes via line 44 to solvent storage 36. Solvent from storage 36 reenters the system by passage from storage 36 through line 45 into line 15 and the water content thereof is adjusted by control of the flow of water from storage 43 in line 15. A portion of the recovered water from storage 43 is passed via line 46 into lines 20 and 24 as the agent for recovery of more solvent from the extract and raffinate phases being treated in towers 17 and 19 respectively.

As one feature of this invention the used solvent from the solvent extraction of lower boiling aromatics is used in whole or in part as the solvent for the extraction of the higher boiling $C_9$–$C_{11}$ aromatics in the high boiling fraction. Thus, used solvent from solvent storage 36 is passed through line 47 into extraction tower 48 where it passes countercurrent to the $C_9$–$C_{11}$ aromatic fraction entering at line 13. The extraction process as applied to the heavy fraction is the same as that just described for the light fraction with the exception of the water content of the solvent. Tower 48 is operated at a temperature of about 80° to 120° F. and a pressure of about atmospheric to 5 p.s.i.g. About 5 to 10 parts of HEDMC containing 3 to 8 wt. percent of water is used in tower 48 per part of heavy aromatic fraction. Extract phase leaves tower 48 via line 49, passing to secondary extraction tower 50. Raffinate from tower 48 is passed by line 51 to water-wash tower 52, where it is contacted with water from line 53 at a temperature of about 100° to 120° F. This treatment results in the separation of a paraffinic phase, which is taken off at line 54 and sent to storage 55, and a water-solvent phase, removed at line 56.

Tower 50, which is constructed like tower 48, receives the extract phase from line 49, and this phase flows countercurrently to the water stream furnished by line 57. This produces a solvent-water mixture which is withdrawn through line 58, and is mixed with the solvent-water mixture in line 56 from tower 52, to form a combined stream which flows into solvent recovery tower 59.

The overhead from tower 50, containing most of the C$_9$–C$_{11}$ aromatic phase, passes through line 60 to aromatic purification tower 61. The application of heat, as by means of steam coil 62, results in the removal of the last traces of solvent from the extract, the latter passing through line 63 to condenser 64 and thence, through line 65 to extract storage 66 or through line 67 back to tower 61 as reflux therein, the former leaving tower 61 at line 68 to storage 69.

The combined water-solvent mixture in line 56 is distilled in tower 59 by the application of heat through coil 72. The water passes as overhead via line 73 to condenser 74. Part of the condensed water is returned to tower 59 as reflux through line 75, the remainder passes via line 76 to water storage 77. The solvent recovered as bottoms from the distillation passes via line 78 to solvent storage 69, water from storage 77 is passed via line 80 to be used in tower 50 and 52 or is used to adjust the water content of the solvent to the desired value by passage into line 81 conveying recycle solvent from storage 69 to tower 48 via line 47.

The overall process as applied to any mixture of hydrocarbons produces raffinates of predominantly paraffinic hydrocarbon fractions which are conveyed to raffinate storage tanks 22 and 55 and produces predominantly aromatic hydrocarbon fractions which are conveyed to extract storage tanks 33 and 66.

Various known methods of recovering the solvent and hydrocarbons from these separated phases may be used. The problem of solvent separation from the raffinate phase is generally not as acute as the separation of the solvent from the extract phase. Normally, with a stable solvent or with a solvent that, though being subject to decomposition on the application of heat, can be re-synthesized, the solvent and extract or raffinate hydrocarbons can be separated by distillation. This method is applicable to the polar carbamates of this invention in particular, because the solvents are not only relatively stable to heat but also boil at a higher temperature than the aromatics.

Other methods of separation include water-washing of either or both phases and treatment of the extract phase with a high-boiling paraffinic hydrocarbon containing no contaminating unsaturated hydrocarbons to dissolve the aromatics and produce a denuded solvent phase. Although the techniques of water-washing of either or both phases, distillation of either or both phases, and treatment of the extract phase with a high-boiling paraffin may be used to separate the solvent from the phases and recover the solvent for purification, adjustment of water content, and recycle in the process of this invention, it is illustrated by application of the water-washing and distillation techniques.

The process of this invention is applicable to a wide variety of extraction conditions and methods of product recovery. Solvent-to-feed ratios of from about 0.5:1 to as high as 10:1 may be used. The extraction conditions may vary from ambient temperatures and atmospheric pressures to temperatures as high as the boiling point of the particular polar-carbamate solvent used. Pressures up to 30 p.s.i.g. or more may be applied to maintain the solvent in the liquid phase, thus allowing the use of higher temperatures.

The solvents of this invention are used with closely controlled amounts of water, that is, about 3% to 8% by wt. Also, mixtures of two or more of the species of solvents may be used. Adjustments in the amount of water within this range may be made to attain the highest degree of efficiency of extraction for any given polar carbamate and feed combination or extraction condition and same are considered to be within the scope of this invention.

The general and preferred conditions to be applied in the process steps of this invention, using the polar-carbamate solvents and the alternate means of extract and raffinate recovery disclosed herein, follow those used in the prior art solvent extraction processes. Primary extraction towers 14 and 48 are operated under conditions which produce extract phases rich in C$_6$–C$_8$ and C$_9$–C$_{11}$ aromatics respectively leaving at lines 16 and 49 and raffinate phases containing the more paraffinic hydrocarbon along with a small amount of solvent leaving at lines 18 and 51. Temperatures in towers 14 and 48 are from 40° F. to as high as 180° F. at pressures ranging from atmosperic to 10 or 15 p.s.i.g. The preferred conditions of extraction for highest efficiency and economy of operation are 100° to 140° F. at 5 p.s.i.g. Solvent/feed ratios may vary from 1:1 to 10:1 and ratios of about 5:1 are preferred. Since the solvents used herein generally boil at temperatures higher than the aromatic hydrocarbons extracted, distillation tower 61 is operated under conditions to accomplish the separation of aromatics as the overhead. For this purpose temperatures between about 185° to 400° F. under pressures between about 0.5 to 20 p.s.i.g. are used. Where water is used throughout wash-water-to-feed ratios of from 0.01:1 to 0.05:1 can be used.

Any N-substituted carbamic acid or ester thereof having one or more polar-substituents can be used as the solvent in carrying out this invention and made to have a high selectivity and capacity for C$_9$–C$_{11}$ aromatics and alkyl homologues thereof by adjusting the water content in accordance with this invention. Species of such solvents are illustrated by:

2-hydroxyethyl N-methyl carbamate
2-hydroxyethyl N,N-dimethyl carbamate
2-hydroxyethyl N-isopropyl carbamate
2-chloroethyl N,N-dimethyl carbamate
2-bromoethyl N-isopropyl carbamate
2-chloroethyl N-isobutyl carbamate
2-hydroxyethyl N-ethyl carbamate
2-hydroxyethyl N,N-dipropyl carbamate
2-chloroethyl N-methyl carbamate
2-chloroethyl N-ethyl carbamate
2-chloroethyl N-isopropyl carbamate
2-chloroethyl N,N-dimethyl carbamate
3-chloropropyl N-methyl carbamate
3-chloropropyl-N-ethyl carbamate
3-chloropropyl-N-isopropyl carbamate
3-chloropropyl-N,N-dimethyl carbamate
2-iodoethyl N-methyl carbamate
2-iodoethyl N-ethyl carbamate
2-iodoethyl N-isopropyl carbamate
2-iodoethyl N,N-dimethyl carbamate
2-fluoroethyl N-methyl carbamate
2-fluoroethyl N-ethyl carbamate
2-fluoroethyl N-isopropyl carbamate
2-fluoroethyl N,N-dimethyl carbamate
2-bromoethyl N-methyl carbamate
2-bromoethyl N-ethyl carbamate
2-bromoethyl N-isopropyl carbamate
2-bromoethyl N,N-dimethyl carbamate
hydroxyphenyl N-methyl carbamate
hydroxyphenyl N-ethyl carbamate
hydroxyphenyl N-isopropyl carbamate
hydroxyphenyl N,N-dimethyl carbamate
p-chlorophenyl N-methyl carbamate
m-bromophenyl N-methyl carbamate
o-fluorophenyl N-ethyl carbamate
2-hydroxyethyl N-decyl carbamate
2-hydroxymethyl N-nonyl carbamate
2-hydroxyhexyl N,N-dicyanomethyl carbamate
2-hydroxyhexyl N,N-dimethoxybutyl carbamate
2-hydroxypropyl N,N-diacetamidoethyl carbamate
2-hydroxyamyl N,N-carboethoxyethyl carbamate
2-hydroxyethyl N,N-di-p-nitrophenyl carbamate
2-morpholinylethyl N,N-dimethyl carbamate
2-hydroxyethyl N-pyridyl carbamate
2-hydroxyethyl N-piperdinyl carbamate
and the like.

As seen from the foregoing species, Y is a polar-substituted alkyl, aryl, alkaryl and cycloalkyl group having 1 to 10 carbon atoms wherein the polar substituents are selected from the group consisting of hydroxy, $C_1$ to $C_5$ alkoxy, cyano, acetamido, $C_1$ to $C_5$ carboalkoxy, nitro, chloro, fluoro, bromo, iodo, morpholino pyridinyl and piperidinyl groups.

The embodiments of this invention in which an exclusive property of privilege is claimed are defined as follows:

1. A process for recovering $C_9$–$C_{11}$ aromatic hydrocarbons from a petroleum feedstock comprising aromatic and non-aromatic hydrocarbons in the $C_9$–$C_{11}$ aromatic hydrocarbon boiling range and which is essentially free of $C_6$–$C_8$ aromatic hydrocarbons, which comprises contacting said feedstock with a solvent composition comprising 3.0 to 8.0% by weight of water and a stable polar-substituted ester of carbamic acid having the formula

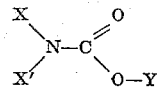

wherein X is a substituent of the group consisting of hydrogen alkyl, cycloalkyl, alkaryl, aryl, polar-substituted alkyl, polar-substituted alkaryl, and heterocyclic groups each having 1 to 10 carbon atoms, X' is a substituent of the group consisting of hydrogen, alkyl, cycloalkyl, alkaryl aryl, polar-substituted alkyl, polar-substituted aryl, polar-substituted alkaryl, and heterocyclic groups each having 1 to 10 carbon atoms, and Y is a polar-substituted alkyl, aryl, alkaryl, cycloalkyl and heterocyclic group each having 1 to 10 carbon atoms, said polar-substituents being of the group consisting of hydroxy, alkoxy, cyano, acetamido, carboalkyloxy, nitro, chloro, fluoro, bromo, iodo, morpholino, pyridinyl, and piperidinyl groups, separating the composite mixture into two components consisting of a raffinate and an extract predominating in in $C_9$–$C_{11}$ aromatic hydrocarbons and recovering said $C_9$–$C_{11}$ aromatic hydrocarbons from said extract.

2. A process as defined in claim 1 wherein said feedstock is prepared by distilling a broad-range petroleum fraction comprising aromatic and non-aromatic hydrocarbons boiling in the $C_6$–$C_8$ range and in the $C_9$–$C_{11}$ range to recover said $C_9$–$C_{11}$ feedstock essentially free of $C_6$–$C_8$ aromatic hydrocarbons.

3. A process as defined in claim 2 wherein said broad-range petroleum fraction is a catalytic reformate.

4. The process in accordance with claim 1 in which X and X' are alkyl groups, and Y is a hydroxy-substituted alkyl group.

5. The process in accordance with claim 1 in which X and X' are methyl groups and Y is hydroxy-ethyl.

6. The process in accordance with claim 1 in which X and X' are alkyl groups and Y is a cyano-substituted aryl group.

7. The process in accordance with claim 1 in which X and X' are alkyl groups and Y is a cyano-substituted alkyl group.

8. The process in accordance with claim 1 in which X and X' are alkyl groups and Y is a halo-substituted alkyl group.

9. The process of separating $C_9$–$C_{11}$ aromatic hydrocarbons and $C_6$–$C_8$ aromatic hydrocarbons from a mixture of aromatic and non-aromatic hydrocarbons which consists in fractionating said mixture into a fraction containing $C_6$–$C_8$ aromatic hydrocarbons and a fraction containing $C_9$–$C_{11}$ aromatic hydrocarbons, separately contacting said $C_6$–$C_8$ aromatic fraction at a temperature of about 20° F. to 180° F. and atmospheric pressure with a solvent composition consisting of about 8% to 15% by weight of water and a stable polar-substituted ester of carbamic acid having the formula

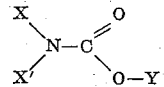

wherein X is a substituent of the group consisting of hydrogen, alkyl, cycloalkyl, alkaryl, aryl, polar-substituted alkyl, polar-substituted aryl, polar-substituted alkaryl, and heterocyclic groups each having 1 to 10 carbon atoms, X' is a substituent of the group consisting of hydrogen, alkyl, cycloalkyl, alkaryl aryl, polar-substituted alkyl, polar-substituted aryl, polar-substituted alkaryl, and heterocyclic groups each having 1 to 10 carbon atoms, and Y is a polar-substituted alkyl, aryl, alkaryl, cycloalkyl and heterocyclic group each having 1 to 10 carbon atoms, said polar-substituents being of the group consisting of hydroxy, alkoxy, cyano, acetamido, carboalkoxy, nitro, chloro, fluoro, bromo, iodo, morpholino, pyridinyl, and piperidinyl groups, separating the composite mixture into three components consisting of a raffinate, an extract predominating in $C_6$–$C_8$ aromatic hydrocarbons and a solvent composition consisting of said carbamic acid ester and about 3% to 8% by weight of water, contacting said $C_9$–$C_{11}$ fraction with said recovered solvent composition, and separating the resulting composite mixture into two components consisting of a raffinate and an extract predominating in $C_9$–$C_{11}$ aromatic hydrocarbons, and separately recovering said $C_6$–$C_8$ aromatics and said $C_9$–$C_{11}$ aromatics from said extracts.

10. The process in accordance with claim 9 in which said mixture of aromatic and non-aromatic hydrocarbons is a catalytic reformate, said $C_6$–$C_8$ aromatic fraction contains benzene, toluene and xylene, said $C_9$–$C_{11}$ aromatic fraction contains cumene, pseudocumene and p-cymene and said solvent is hydroxyethyldimethylcarbamate.

11. The process in accordance with claim 9 in which X and X' are alkyl groups, and Y is a hydroxy-substituted alkyl group.

12. The process in accordance with claim 9 in which X and X' are methyl groups and Y is hydroxy-ethyl.

13. The process in accordance with claim 9 in which X and X' are alkyl groups and Y is a cyano-substituted aryl group.

14. The process in accordance with claim 9 in which X and X' are alkyl groups and Y is a cyano-substituted alkyl group.

15. The process in accordance with claim 9 in which X and X' are alkyl groups and Y is a halo-substituted alkyl group.

References Cited by the Examiner

UNITED STATES PATENTS

| | | |
|---|---|---|
| 2,954,397 | 9/1960 | Martinek et al. _____ 208—324 |
| 2,978,520 | 4/1961 | Blum et al. _____ 208—324 |
| 3,003,005 | 10/1961 | Martinek et al. _____ 208—331 |

DELBERT E. GANTZ, *Primary Examiner.*

H. LEVINE, *Assistant Examiner.*